United States Patent [19]
Kobayashi

[11] Patent Number: 5,707,074
[45] Date of Patent: Jan. 13, 1998

[54] STABILIZER SUPPORT STRUCTURE

[75] Inventor: Kenju Kobayashi, Yokohama, Japan

[73] Assignee: Nissan Motor Co., Ltd., Kanagawa-ken, Japan

[21] Appl. No.: 552,319

[22] Filed: Nov. 2, 1995

[30] Foreign Application Priority Data

Nov. 4, 1994 [JP] Japan .................... 6-271258

[51] Int. Cl.⁶ .................................. B60G 21/00
[52] U.S. Cl. ............................. 280/689; 280/723
[58] Field of Search ................. 280/689, 723, 280/772

[56] References Cited

U.S. PATENT DOCUMENTS

| | | | |
|---|---|---|---|
| 2,455,787 | 12/1948 | Linn | 280/723 |
| 2,620,181 | 12/1952 | Troche | 280/723 |
| 2,684,237 | 7/1954 | Kayler | 280/723 |
| 3,054,625 | 9/1962 | Haley | 280/723 |
| 3,175,842 | 3/1965 | Rogers | 280/723 |
| 4,033,605 | 7/1977 | Smith et al. | 280/723 |
| 4,143,887 | 3/1979 | Williams et al. | 280/723 |

FOREIGN PATENT DOCUMENTS 2-42306  3/1990  Japan .

*Primary Examiner*—Kenneth R. Rice
*Attorney, Agent, or Firm*—Lowe, Price, LeBlanc & Becker

[57] ABSTRACT

An object of the present invention is to make it possible to reinforce a support of a suspension arm as well as to simplify a supporting structure of a stabilizer, and to increase an efficiency of the stabilizer. A stabilizer supporting structure comprises a suspension member 9 provided at a side of a vehicle body to extend in a longitudinal direction of the vehicle body, a first bracket 25 separated from the suspension member 9 and a second bracket 27 integral with it, these brackets being arranged one after another in a longitudinal direction of the vehicle body to support cooperatively one end 29a of a suspension arm 29, a stabilizer supporting portion 39 provided at said first bracket 25 for rotatably supporting the stabilizer 1.

11 Claims, 4 Drawing Sheets

5,707,074

STABILIZER SUPPORT STRUCTURE

BACKGROUND OF THE INVENTION

1. Field of the Invention

The present invention relates to a stabilizer support structure which also serves to reinforce a suspension arm support structure.

2. Description of the Related Art

As an example of a conventional stabilizer support structure, a structure shown, for example, in FIGS. 1 and 2 is known (see Japanese Utility Model Publication (KOKAI) 2-42806). That is, a stabilizer 1 is provided with a clamp 5, which is a member separate from a suspension cross member 3, and is rotatably supported on the suspension cross member 3 through a rubber bush 7. Therefore, it is possible to firmly support the stabilizer 1 on the suspension member 3.

However, the above structure needs the special clamp 5 for supporting the stabilizer 1, and has a disadvantage that the number of parts are increased, thereby an assembly and a parts management may be complicated. Further, as the stabilizer 1 is supported at the outside of the suspension cross member 3 by the clamp 5, there is a problem that a distance from an attachment point relative to an end suspension of the stabilizer 1 to a position of the clamp 5 becomes longer, and when functions as a stabilizer an amount of a torsion becomes smaller and the efficiency is degraded.

SUMMARY OF THE INVENTION

Hence, it is an object of the present invention to provide a stabilizer support structure in which a special member for supporting the stabilizer 1 is not necessary, the number of the parts is reduced, and an assembly and a parts management are facilitated; and in which the efficiency of the stabilizer can be increased.

In order to solve the above problem, the invention is characterized by comprising a suspension member provided on a side of a vehicle body and extending in a longitudinal direction of the vehicle body, a first bracket separated from the suspension member and a second bracket integral with it, these brackets being arranged one after another in a longitudinal direction of the vehicle body to support cooperatively one end of a suspension arm, a stabilizer supporting portion provided at the first bracket for rotatably supporting the stabilizer.

According to this invention, by means of the first bracket separated from the suspension member provided on the side of the vehicle body and extending in the longitudinal direction of the vehicle body and the second bracket integral with it, one end of the suspension arm may be supported cooperatively. Then, by meas of the stabilizer supporting portion of the first bracket, the stabilizer may be rotatably supported.

Furthermore the invention is characterized by comprising a suspension member provided on a side of a vehicle body and straddling a front axle, which extends from a front differential gear, in a longitudinal direction of the vehicle body, a first bracket separated from the suspension member and a second bracket integral with it, these brackets being arranged one after another in a front side of a longitudinal direction of the vehicle body to support cooperatively one end of a suspension arm and form a mutual space which a steering rack 33 passes through, a stabilizer supporting portion provided at the first bracket for rotatably supporting the stabilizer.

According to this invention, by means of the first bracket separated from the suspension member provided at the side of the vehicle body and straddling a front axle in the longitudinal direction of the vehicle body and the second bracket integral with it, one end of the suspension arm may be supported cooperatively. Between the first and the second brackets, the steering rack can be passed. Then the stabilizer can be rotatably supported by the stabilizer supporting portion of the first bracket.

Moreover the invention is characterized in that the suspension member is provided with a downwardly directed abutting surface, the first bracket is provided with a upwardly directed abutting surface, the abutting surface of the first bracket is provided with a concave stabilizer supporting portion, both of the abutting surfaces being abutted to fix said first bracket to the suspension member, and to cause the stabilizer supporting portion to support the stabilizer rotatably.

According to this invention, the upwardly directed abutting surface can be abutted to the downwardly directed abutting surface to fix it. The stabilizer can be rotatably supported at the concave portion arranged in the abutting surface of the first bracket.

DESCRIPTION OF THE PREFERRED EMBODIMENT

Now, an embodiment of the present invention will be described hereinafter with reference to accompany drawings.

Figure 1:
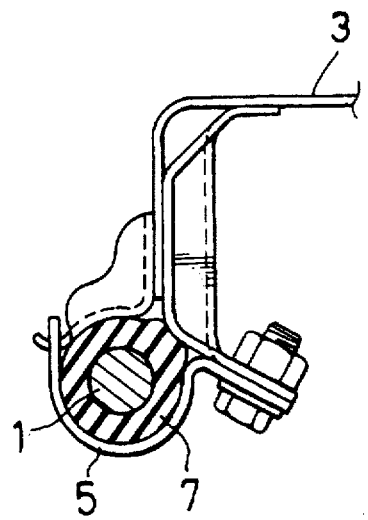
FIG. 1 is a sectional view of a related art.
Figure 2:
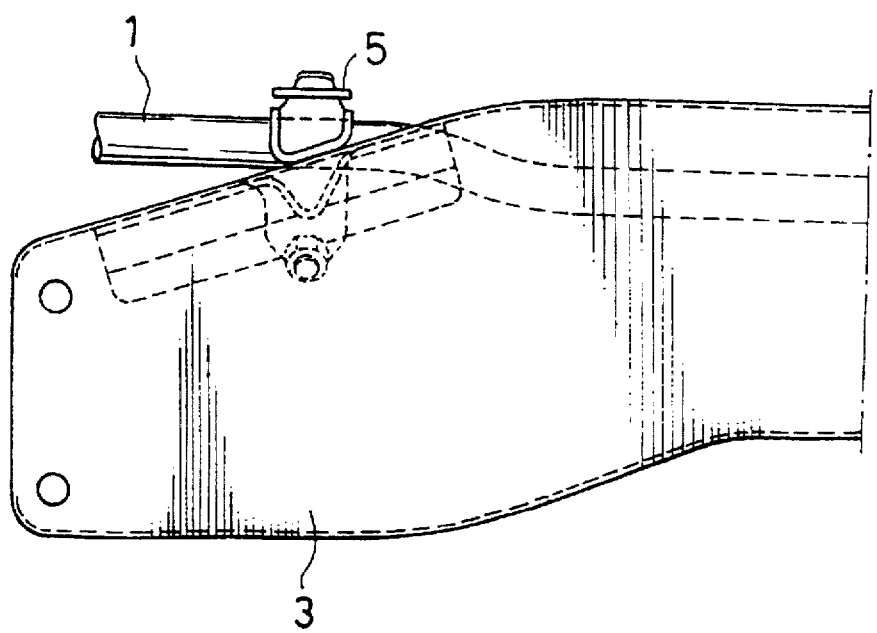
FIG. 2 is a plane view of the related art.
Figure 3:
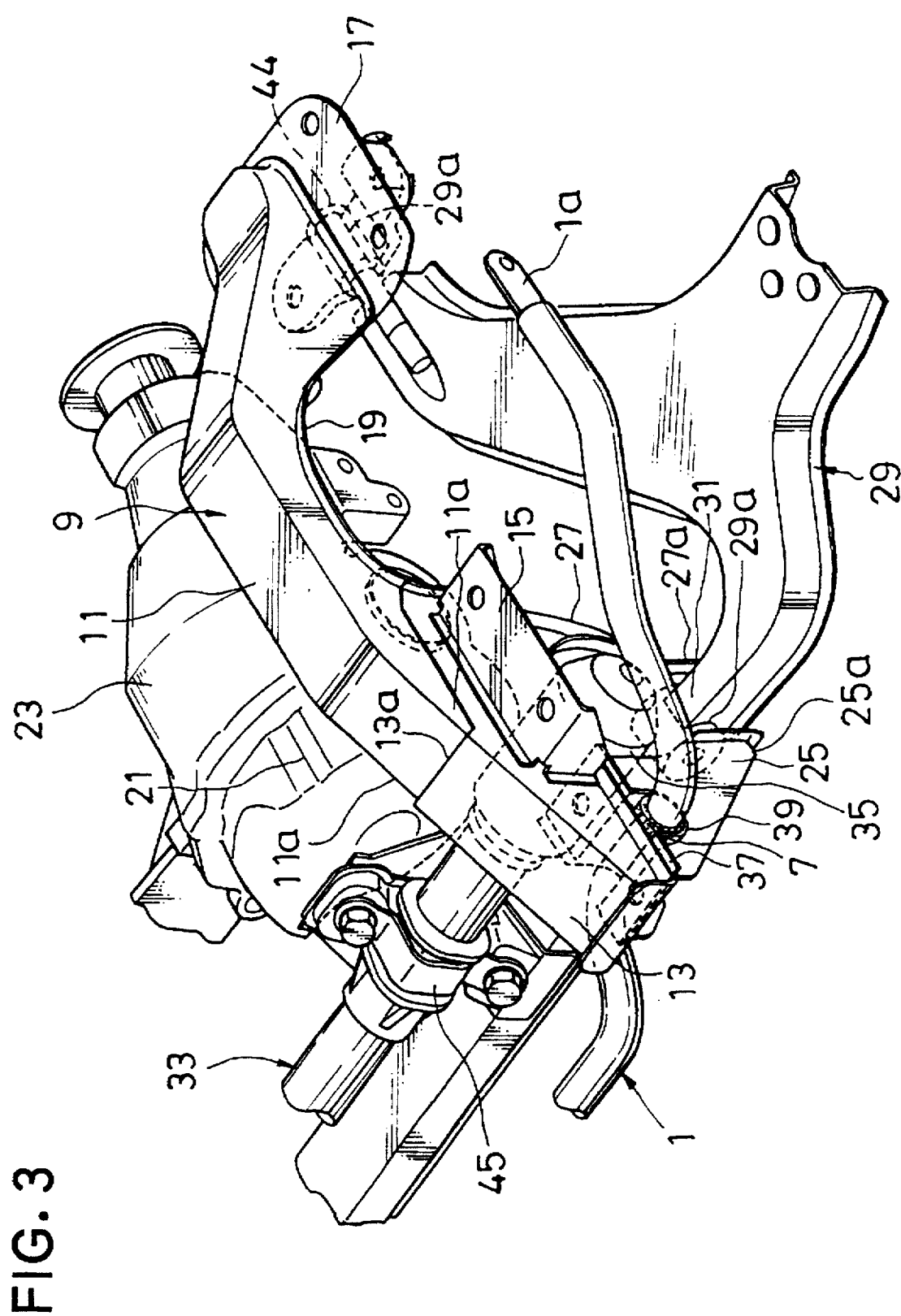
FIG. 3 is a perspective view of an embodiment of the present invention.
Figure 4:
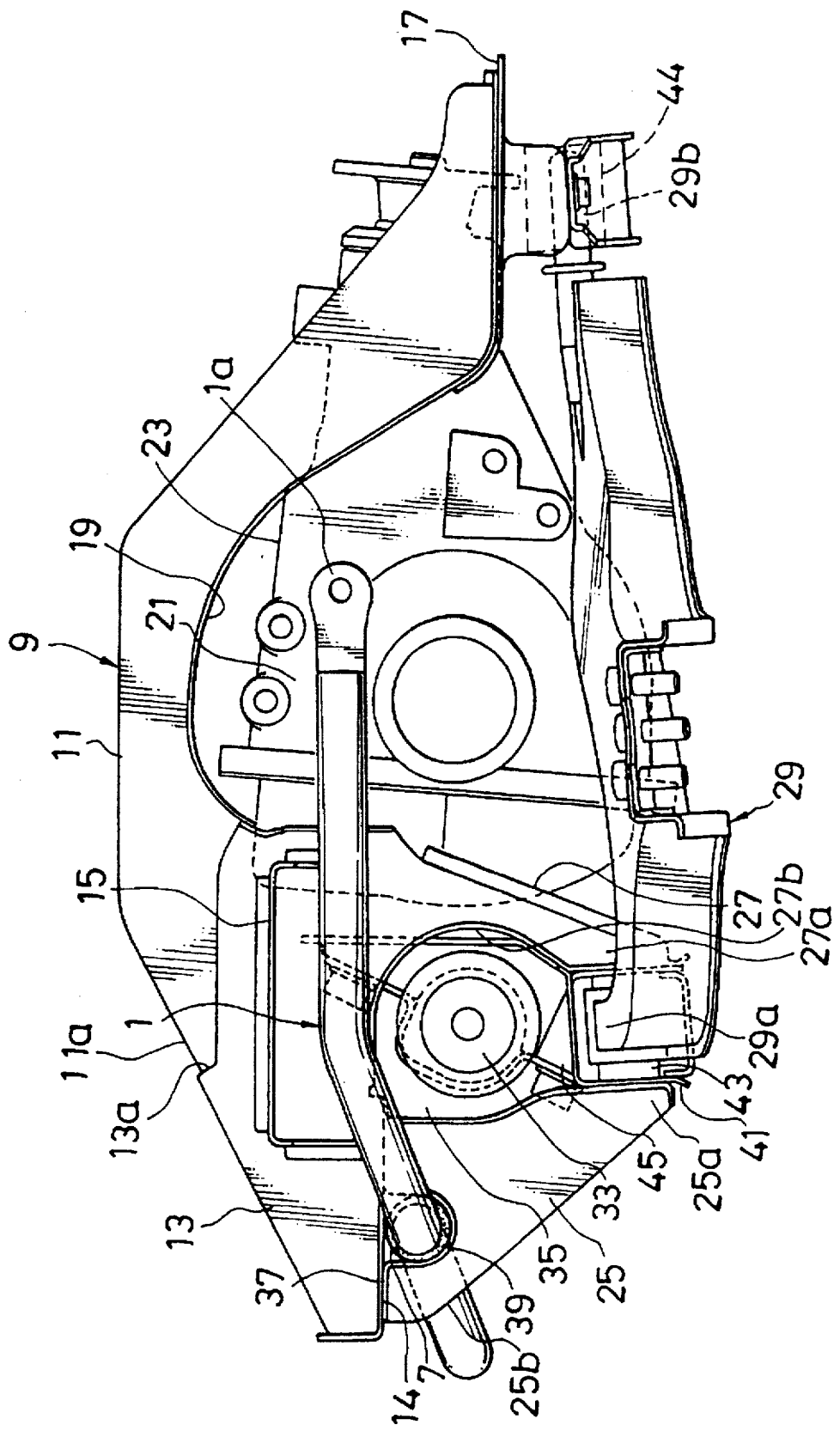
FIG. 4 is a side view of the embodiment of the present invention.
Figure 5:
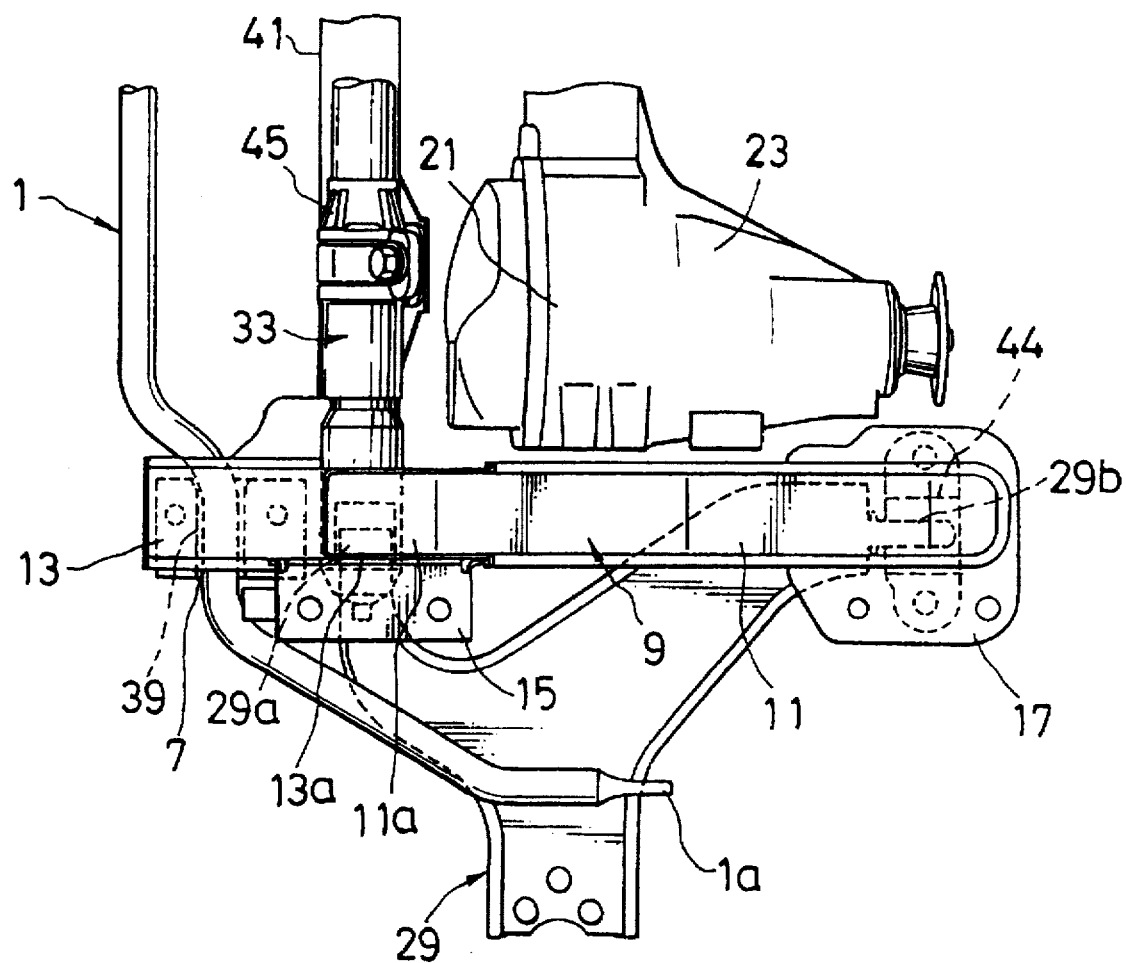
FIG. 5 is a plane view of the embodiment of the present invention.

FIG. 3 is a perspective view showing a stabilizer support structure according to an embodiment of the present invention, FIG. 4 is a side view of the stabilizer support structure, and FIG. 5 is a plane view of the stabilizer support structure. FIGS. 3, 4 and 5 show the stabilizer support structure for a front suspension at a left side wheel part in a moving direction of a vehicle body. It is to be noted that a support structure at a right side wheel part, not shown, is constructed in substantially the same manner as the left side support structure.

As shown in FIG. 3, a suspension member 9 extending in a longitudinal direction of the vehicle body is provided on a side of the vehicle body. The suspension member 9 having a channel-like cross section presents generally an arch-like shape and is composed of a suspension member body 11 formed as a whole structure and a member front portion 13 constituting a front portion. The member front portion 13 is provided with a plane abutting surface 14 directed downward as well as a fitting portion 13a being fitted with the suspension member body, the fitting portion 13a being superposed so as to be fitted on a forward portion 11a of the suspension member body 11 and being integrally connected by a spot welding or the like. Connecting flanges 15 and 17 are integrally connected to the suspension member body 11 and the member front portion 13 by a spot welding or the like, and these connecting flanges 15 and 17 are fastened to the vehicle body by tightening bolts and nuts (not shown). It is to be noted that the suspension member 9 may be fitted through so-called a soft mount. The suspension member 9 with such a construction presents the arch like shape as mentioned above and has an arch concave 19 in the lower part through which a front axle, which is not shown, extending from a front differential gear 21 extends in a transversely outward direction of the vehicle. Accordingly, the suspension member 9 is constructed to straddle the front axle in the longitudinal direction of the vehicle body.

It is to be noted that the front differential gear 21 is interlockingly connected to a transfer gear 23 and that a drive force supplied to the transfer gear 23 through a transmission gear from an engine, which is not shown, is transmitted through the front differential gear 21 to the front axle and is also transmitted to a rear differential gear. In the meanwhile, the embodiment of the present invention especially comprises a first bracket 25 separated from the suspension member 9 and a second bracket 27 integral with it. The first and second brackets 25 and 27 are arranged one after another at the front portion in the longitudinal direction of the vehicle body, and both of the first and second brackets support an end 31 of the suspension arm 29 and have a mutual space 35 providing a passage for a steering rack 33.

The first bracket 25 has a substantially triangle shape when viewed from a side. An upper part of the first bracket 25 is provided with a plane abutting surface 37 directed upward. This upwardly directed abutting surface 37 is provided with a concave stabilizer support portion 39 for supporting a stabilizer 1. The upwardly directed abutting surface 37 of the first bracket 25 abuts the downwardly directed abutting surface 14, and is detachably connected by a bolt and nut. Since such plane abutting surfaces 14 and 37 are abutted and fasten by the bolts and nuts, fixation of the first bracket 25 to the suspension member 9 is ensured. In the stabilizer support portion 39, the stabilizer 1 is rotatably supported through a rubber bush 7. This support is stable due to the plane abutting surfaces 14 and 37. It is to be noted that a rear end portion 1a (an attachment point to the suspension side) is connected to a lower part (not shown) of a strut tower (not shown).

The second bracket 27 also presents a substantially triangle shape when viewed from a side of the vehicle body. However, a rounded portion 27b corresponding to the steering rack 33 is formed at an upper portion of the second bracket 27 to form the mutual space 35. Therefore, the dimension of the second bracket 27 in the longitudinal direction of the vehicle body is made small. Lower parts of the first and second trackers 25 and 27 from supporting portions 25a and 27a for the suspension arm 29. To these supporting portions 25a and 27a of the first and second brackets 25 and 27, a link mount bracket 41 is fixed by a spot welding or the like. At the supporting portions 25a and 27a, one end 29a of the suspension arm 29 at a front side of the vehicle body is rotatably supported on the link mount bracket 41 through a rubber bush 43. The other end 29b of the suspension arm 29 at a rear side of the vehicle body is supported on the suspension member 9 of the vehicle body side through a rubber bush 44.

The link mount bracket 41 extends in a transverse direction of the vehicle and made as a cross member as shown in FIG. 5. On the link mount bracket 41, a rack mount bracket 45 is arranged at a position between the right and left suspension members 9 in a transverse direction of the vehicle. The rack mount bracket 45 supports the steering rack 33 which passes through the mutual space 35 between both brackets 25 and 27.

Next, the reason why the first bracket 25 is separated from the suspension member 9 is described from view points of a steering rack layout and a suspension arm layout.

A. Steering layout (1) As shown in FIGS. 3 to 5, since a suspension structure for a front engine vehicle includes a front axle which extends transversely from the front differential gear 21 and connects a wheel supported by the suspension arm 29, the steering rack 33 is arranged at the front side of the front differential gear 21 in its layout.

(2) Since the steering rack 33 has a character which allows to receive a force transmitted from the wheel side when the wheel changes its toe due to a deformation of the rubber bush 43 or the like shown in FIG. 4, a degree of freedom for layout of the steering rack 33 in the longitudinal direction and in the transverse direction of the vehicle body is small for suitably establishing the character of the toe change, with the result that the layout substantially shown in FIGS. 3 to 5 is obtained.

B. Suspension arm layout (1) As the suspension arm 29 supports the wheel connected to the front axle extending from the front differential 21 as described above, the steering rack 33 is arranged as shown in FIGS. 3 to 5 to form the layout of the suspension arm 29 and the front differential gear 21.

(2) The suspension arm 29 is supported by the suspension member 9 as shown in FIGS. 3 to 5. However, the steering rack 33 is arranged as shown in FIGS. 3 to 5 in order to establish the layout for the suspension arm 29 supported in this way and the front differential gear 21.

(3) To suitably set the character for the toe change as described above, the arrangement of the steering rack 33 and the suspension arm 29 can not be shifted considerably from that shown in FIGS. 3 to 5.

From the above, the steering rack 33 passes over the one end 29a of the suspension arm 29, which is located below the front portion of the suspension member 9. Hence, the second bracket 27 needs the rounded portion 27b with a large radius and has to be made thin as a whole so as to prevent interference with the steering rack 33. From this, the separate first bracket 25 is needed in addition to the second bracket 27 to reinforce the second bracket 27 and to support cooperatively one end 29a of the suspension arm 29.

On the other hand, in the case of fixing the suspension member 9 to the vehicle body by fastening, in particular, fastening and fixing the front connecting flange 15, a work space is necessary for a worker to insert the bolt from the lower side of the vehicle body. Therefore, the first bracket 25 is detached when the connecting flange 15 is fixed by fastening, and after completion of fixing of the connecting flange 15, the first bracket 25 is fixed by fastening to the member front portion 13 of the suspension member 9. Therefore, the first bracket 25 which cooperates to support one end 29a of the suspension arm 29 together with the second bracket 27 is constructed to form a structure separate from the suspension member 9 as mentioned above.

And, by the separate structure of the first bracket 25 as mentioned above, the stabilizer support portion 39 for supporting the stabilizer 1 is provided to support the stabilizer 1 together with the first bracket 25.

With this structure, no special member for supporting the stabilizer 1 is required, the number of the parts is reduced, and an assembly and a parts management are extremely facilitated.

When a special supporting member for the stabilizer 1 is provided, a structure is such that the supporting member is provided on an inclined surface 25b at the forward side in the longitudinal direction of the vehicle body. However, in this case, the distance from the supporting portion of the stabilizer 1 to the rear end portion 1a of the stabilizer 1 becomes longer, the amount of torsion becomes small when the stabilizer is operated, and the efficiency is degraded. On the contrary, when the stabilizer supporting portion 39 is provided at a portion of the first bracket 25 to support the stabilizer 1, the distance from the stabilizer supporting portion 39 to the rear end portion 1a of the stabilizer 1 is shortened, and the amount of torsion of the stabilizer 1 becomes larger, thereby the efficiency of the stabilizer 1 being increased.

As can be seen from the above, according to the invention, one end of the suspension arm is supported cooperatively by both of the first and second brackets, and by the first bracket, the support for the suspension arm can be reinforced. Moreover, as the first bracket has a separate structure relative to the suspension member, the stabilizer can be rotatably supported by the stabilizer supporting portion arranged in the first bracket. Therefore, as any special parts for supporting the stabilizer are not needed, the number of the parts is reduced, the assembly and the management of the parts become extremely easily. Besides, the distance between the stabilizer supporting portion and the point where the end portion of the stabilizer is attached to the suspension can be shortened, and the efficiency of the stabilizer can be increased.

Moreover according to the invention, one end of the suspension arm is supported cooperatively by both of the first and second brackets, and by means of the first bracket, the support for the suspension arm can be reinforced. Therefore, between both brackets, the mutual space through which the steering rack passes is formed, and the suspension arm is supported certainly by supporting cooperatively even if the second bracket would be made thin. Besides, the stabilizer is supported by the stabilizer supporting portion provided on the separate first bracket. Therefore, as any special parts for supporting the stabilizer are not needed, the number of the parts is reduced, the assembly and the management of the parts become extremely easy. Besides, the distance between the stabilizer supporting portion and the point where the end portion of the stabilizers attached to the suspension can be shortened, and the efficiency of the stabilizer can be increased extremely.

Furthermore according to the invention, the abutting surface of the first bracket abuts the abutting surface of the suspension member and is fixed stably, and the first bracket can be attached reliably. Besides, the stabilizer can be supported simply and stably in the concave stabilizer supporting portion arranged at the abutting surface of the first bracket.

What is claimed is:

1. A stabilizer supporting structure comprising:

a suspension member of an independent suspension provided on a side of a vehicle body and extending in a longitudinal direction of the vehicle body;

a first bracket separate from the suspension member and a second bracket integral with the suspension member, the first and second brackets being arranged one after another in a longitudinal direction of the vehicle body to support cooperatively one end of a suspension arm; and a stabilizer supporting portion provided at the first bracket for rotatably supporting a stabilizer.

2. A stabilizer supporting structure according to claim 1, wherein:

the suspension member is provided with a downwardly directed abutting surface;

the first bracket is provided with an upwardly directed abutting surface;

the upwardly directed abutting surface of the first bracket has a concave part as the stabilizer supporting portion; and the downwardly and upwardly directed abutting surfaces are abutted for fixing the first bracket to the suspension member so that the stabilizer is rotatably supported by the concave part.

3. A stabilizer supporting structure according to claim 2, wherein the downwardly directed abutting surface is flat over an area thereof and cooperates with the concave part of the upwardly directed abutting surface for rotatably supporting the stabilizer.

4. A stabilizer supporting structure according to claim 1, wherein the suspension arm is vertically swingably supported at said one end thereof by the first and second brackets.

5. A stabilizer supporting structure comprising:

a suspension member provided on a side of a vehicle body and extending in a longitudinal direction of the vehicle body to straddle a front axle extending from a front differential gear;

a first bracket separated from the suspension member and a second bracket integral with the suspension member, the first and second brackets being arranged one after another at a front part of the suspension member in a longitudinal direction of the vehicle body to support cooperatively one end of a suspension arm; and a stabilizer supporting portion provided at the first bracket for rotatably supporting a stabilizer.

6. A stabilizer supporting structure according to claim 5, wherein:

the suspension member is provided with a downwardly directed abutting surface;

the first bracket is provided with an upwardly directed abutting surface;

the upwardly directed abutting surface of the first bracket has a concave part as the stabilizer supporting portion; and the downwardly and upwardly directed abutting surfaces are abutted for fixing the first bracket to the suspension member so that the stabilizer is rotatably supported by the concave part.

7. A stabilizer supporting structure according to claim 6, wherein the downwardly directed abutting surface is flat over an area thereof and cooperates with the concave part of the upwardly directed abutting surface for rotatably supporting the stabilizer.

8. A stabilizer supporting structure according to claim 5, wherein the suspension arm is vertically swingably supported at said one end thereof by the first and second brackets.

9. A supporting structure for supporting a torsional part of a stabilizer and a pair of pivotal ends of a vertically swingable suspension arm cooperative with the stabilizer for a resilient independent suspension of a wheel of a vehicle, the structure comprising:

a rigid suspension member having:

a first support part for supporting one of the pivotal ends of the suspension arm and a second support part spaced at a distance from the first support part in a longitudinal direction of the vehicle;

a first bracket member fixed at an upper part thereof to the suspension member; and a second bracket member having:
- an upper part thereof fastened to the second support part, with a support hole defined therebetween for supporting the torsional part of the stabilizer, and
- a lower part thereof facing a lower part of the first bracket member to support the other pivotal end of the suspension arm disposed therebetween.

10. A supporting structure according to claim 9, wherein:

the second support part has an underside thereof formed with a substantially flat surface;

the upper part of the second bracket member has an upper side thereof formed with a recess; and the support hole is defined between the flat surface and the recess.

11. A suspension arrangement comprising:

a suspension arm, said suspension arm having first and second pivotal end portions pivotally supported at a side of a vehicle body by way of first and second elastomeric bushes respectively;

a stabilizer bar adapted for operative connection with the suspension arm;

an arch-like suspension member adapted for operative connection with the first and second pivotal ends of said suspension arm; and bracket means, including first and second brackets, for supporting the first pivotal end of said suspension arm, the first and second brackets being arranged on either side of the first pivotal end, the first bracket being connected to a lower side of said arch-like suspension member and including a recess in which said stabilizer bar is rotatably supported and retained between the first bracket and arch-like suspension member.

* * * * *